Dec. 23, 1952    W. J. STAFFE    2,622,918
TRAILER BED
Filed July 1, 1950
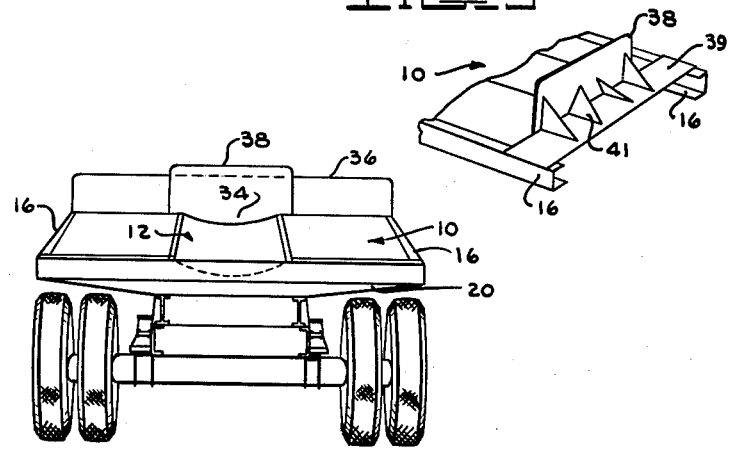
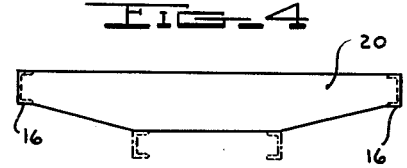
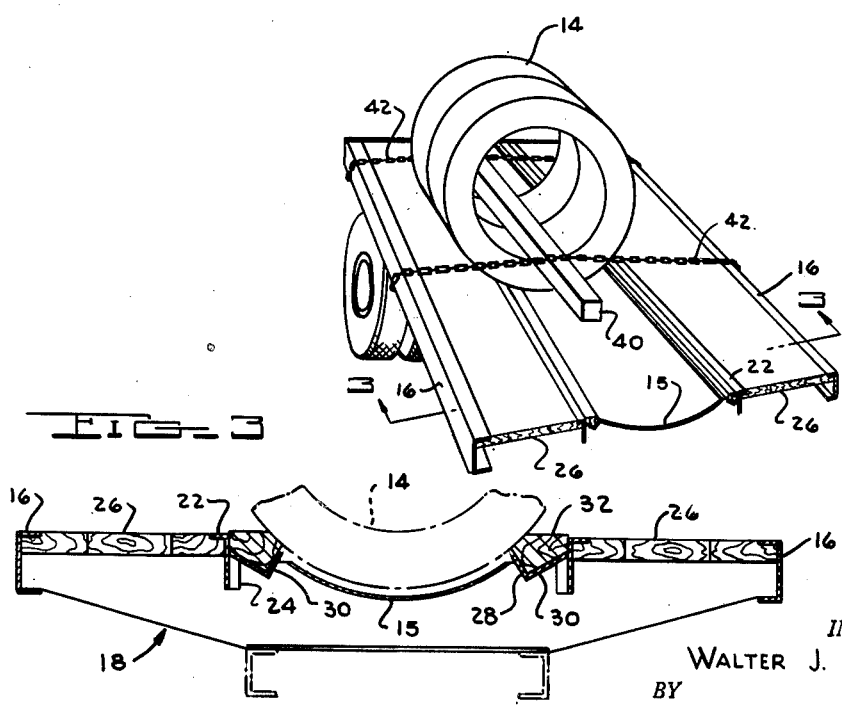
INVENTOR.
WALTER J. STAFFE
BY
Arthur M. Smith
ATTORNEY Patented Dec. 23, 1952

2,622,918

UNITED STATES PATENT OFFICE 2,622,918

TRAILER BED

Walter J. Staffe, Lincoln Park, Mich.

Application July 1, 1950, Serial No. 171,601

3 Claims. (Cl. 296—28)

The present invention relates to a trailer bed and particularly to a trailer bed having a longitudinal depression formed therein which is adapted to carry coils of steel or other circularly-shaped objects in a firmly seated position.

There has existed a need in the highway transportation of heavy coils of steel and other objects having a circular contour for the provision of a trailer bed construction which will firmly seat such coils and curb their tendency to roll. Most prior constructions which have attempted to solve this problem have provided superstructure on the trailer bed such as upwardly extending rails, clamps, and the like. This is objectionable, since this superstructure prevents the use of the trailer for hauling other types of cargo.

Coils of strip steel generally range in weight from approximately 2,000 pounds to approximately 20,000 pounds. It is obvious that if these coils are not firmly seated in position during transportation, great damage could result. It is necessary to provide against the tendency of the coils to roll and also to provide against the possible unbalancing of the coils along their transverse axes. Should the trailer become disconnected from the tractor while traveling on the highway, it is extremely dangerous to have the load of steel coils accidentally fall from the trailer. In addition, it is necessary to provide maximum protection for the driver and others on the highway. In addition to this element of danger, the damage to the steel causes the trailer operator to sustain heavy losses.

Trailer beds used in the hauling of steel coils or other circularly-shaped cargo in one direction frequently are required to haul other shapes of cargo in the other direction. If a superstructure is fixed to the trailer bed, it frequently must be removed and replaced. This is a costly operation. Loading of steel coils or other circularly-shaped heavy cargo is made more time-consuming and, hence, more costly by the use of such superstructures.

Therefore, it is a primary object of the present invention to provide a simple and efficient hauling car bed particularly adapted for hauling steel coils, which eliminates the need for superstructure on the bed and thus permits the hauling car to handle loads other than steel coils or other circularly-shaped cargo.

It is another object of the present invention to provide a trailer bed particularly adapted for hauling coils of steel which firmly seats such coils and prevents accidental displacement thereof.

It is a further object of the present invention to provide a simple and efficient trailer bed particularly adapted for hauling coils of steel, which includes means to seat said coils in such a manner as to minimize the possibility of marring or scratching the steel.

Other objects of this invention will appear in the following description and appended claims, reference being had to the accompanying drawings forming a part of this specification wherein like reference characters designate corresponding parts in the several views.

In the drawings:

Fig. 1 is a rear elevation of a trailer embodying the trailer bed of the present invention;

Fig. 2 is a fragmentary perspective view of the trailer shown in Fig. 1 showing coils of steel as held in place for transportation;

Fig. 3 is a section along the line 3—3 in the direction of the arrows, Fig. 2;

Fig. 4 is an elevation of one of the end cross braces of a trailer bed embodying the present invention; and Fig. 5 is a fragmentary perspective view particularly showing the supporting structure for the protective shield.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, the trailer bed of the present invention is provided with a flat platform 10 having a central longitudinal trough 12 which in cross section approximates an arc on the circumference of a coil of steel 14 which the trailer is adapted to carry. The trough is preferably lined with diamond steel flooring 15 for added strength. One such trough which has been used successfully provides a six inch drop from the level of the trailer bed at the center of the trough and is twenty-seven inches in width. This will accommodate a particular range of sizes of steel coils. If the coils substantially depart from this range, it is desirable to provide a trough of different dimensions.

The structural members of the trailer bed comprise the longitudinal channel irons 16, the intermediate cross braces 18, and the end cross braces 20. The longitudinal channel irons 16 are welded to the transverse braces 18 and 20 to provide the skeleton of the trailer bed. Referring to Fig. 3, longitudinal angle irons 22 are welded in place in slots 24 on the intermediate braces 18, and wooden planks 26 or other suitable deck material is held in place on each side of the trailer bed by the angle irons 22 and the channel irons 16. Spaced inwardly from the slots 24 adjacent each side of the trough 12 is an angular recess 28. Fixed in place in each of said recesses 28 is an angle iron 30. The angle irons 30 are welded to the end cross braces 20 and are also welded to the intermediate braces 18 and angle irons 22.

Disposed within each angle iron 30 is a wooden strip 32 which provides a seat for the coils 14 and prevents metal-to-metal contact, thus reducing the possibility of marring or scratching the steel which is being shipped.

A steel plate 34 is disposed on the end braces 20 to prevent the coils 14 from falling off the trailer. A guard fence 36 is disposed around the forward end of the trailer bed, and a protective shield 38, formed of boiler plate or other strong material, is disposed rearward of said guard fence over the forward plate 34 and the front end of the trough 12. This shield 38 is provided primarily for the protection of the truck driver in case of an accident or in case the coils break loose. The forward ends of the channel irons 16 extend a short distance beyond the trailer bed 10 and provide the foundation for a supporting means for shield 38. One such means is shown in Fig. 5 of the drawings wherein a transverse base 39 is welded to the channels 16 and a plurality of guest plates 41 are welded to the shield 38 and base 39.

Fig. 2 of the drawings discloses the manner in which the coils can be locked in position for transportation. A suitable bar 40 is disposed through the steel coils 14 and is anchored to the trailer bed by means of the anchoring chains 42. The ends of the chains 42 may be fastened together or may be fastened to the bed. A suitable turnbuckle or tightening device may be provided to adjust the tension in the chains 42. This manner of fastening the coils in place not only prevents longitudinal movement of the coils, but also helps to prevent side-sway of the coils during movement of the truck. Although this is a preferred manner of locking the coils in position, other suitable fastening means may be utilized without departing from the spirit of my invention.

It is to be understood that the bed construction shown in the drawing is also readily adapted for use on railway flat cars.

Having thus described my invention, I claim:

1. A trailer bed particularly adapted for transporting coils of strip steel and comprising a flat platform having a central longitudinally disposed recess therein, an arcuate trough provided in said recess by a floor disposed therein, an angle iron angularly disposed along the top of said recess on each side thereof and rigidly secured to cross sills affixed to the ends of said platform, a wooden strip disposed within each of said channel irons said wooden strips having seating portions formed thereon to seat the coils and prevent marring and scratching thereof, an end member extending upwardly to the level of said platform on each end of said trough, a shield extending upwardly from said platform at the forward end of said trough to protect the cab of the truck, and fastening means for locking the coils of steel in carrying position.

2. A trailer bed for transporting coils of strip steel and comprising a flat platform having a central longitudinally disposed recess therein, an arcuate trough disposed in said recess, a retaining member disposed along the top of said recess on each side thereof and rigidly secured to cross sills affixed to the ends of said platform, a seating member disposed within each of said retaining members to seat the coils and prevent marring and scratching thereof, an end member extending upwardly to the level of said platform on each end of said trough, a shield extending upwardly from said platform at the forward end of said trough to protect the cab of the truck, and fastening means for locking the coils of steel in carrying position.

3. A trailer bed for transporting coils of strip steel and comprising a flat platform having a central longitudinally disposed recess therein, an arcuate trough disposed in said recess, a retaining member disposed along the top of said recess on each side thereof and rigidly secured to cross sills affixed to the ends of said platform, a seating member disposed within each of said retaining members to seat the coils and prevent marring and scratching thereof, an end member extending upwardly to the level of said platform on each end of said trough, and fastening means for locking the coils of steel in carrying position.

WALTER J. STAFFE.

REFERENCES CITED

The following references are of record in the file of this patent:

UNITED STATES PATENTS

| Number | Name | Date |
| --- | --- | --- |
| 79,573 | Ilgenfritz et al. | July 7, 1868 |
| 210,527 | Harris | Dec. 3, 1878 |
| 493,940 | McIlwain | Mar. 21, 1893 |
| 1,280,210 | Golding | Oct. 1, 1918 |
| 1,857,796 | Styslinger | May 10, 1932 |
| 2,387,902 | Hedges | Oct. 30, 1945 |
| 2,504,222 | Otto | Apr. 18, 1950 |
| 2,541,274 | Nixon | Feb. 13, 1951 |
| 2,560,715 | Bill | July 17, 1951 |

FOREIGN PATENTS

| Number | Country | Date |
| --- | --- | --- |
| 47,854 | France | May 4, 1937 |